(12) United States Patent
Yoon et al.

(10) Patent No.: US 11,379,074 B2
(45) Date of Patent: Jul. 5, 2022

(54) PAD ELECTRODE PART AND TOUCH SENSOR THEREWITH

(71) Applicant: DONGWOO FINE-CHEM CO., LTD., Iksan-si (KR)

(72) Inventors: Ju In Yoon, Pyeongtaek-si (KR); Keon Kim, Gunpo-si (KR); Jaehyun Lee, Uiwang-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/291,329

(22) PCT Filed: Nov. 8, 2019

(86) PCT No.: PCT/KR2019/015141
§ 371 (c)(1),
(2) Date: May 5, 2021

(87) PCT Pub. No.: WO2020/096405
PCT Pub. Date: May 14, 2020

(65) Prior Publication Data
US 2022/0027035 A1 Jan. 27, 2022

(30) Foreign Application Priority Data

Nov. 9, 2018 (KR) .................. 10-2018-0137379
Nov. 7, 2019 (KR) .................. 10-2019-0141972

(51) Int. Cl.
*G06F 3/041* (2006.01)

(52) U.S. Cl.
CPC ................ *G06F 3/04164* (2019.05)

(58) Field of Classification Search
CPC .................................. G06F 3/04164
USPC ........................................... 345/174
See application file for complete search history.

(56) References Cited

U.S. PATENT DOCUMENTS

| 5,569,964 | A | 10/1996 | Ikebe | |
|---|---|---|---|---|
| 2013/0134584 | A1* | 5/2013 | Wada | ............ H01L 23/481 257/737 |
| 2014/0043278 | A1* | 2/2014 | Rebeschi | ............ G06F 3/04164 345/174 |

(Continued)

FOREIGN PATENT DOCUMENTS

| JP | 2012-009508 A | 1/2012 |
|---|---|---|
| KR | 10-2002-0078217 A | 10/2002 |
| KR | 10-2012-0030776 A | 3/2012 |

(Continued)

OTHER PUBLICATIONS

International Searching Authority, International Search Report of PCT/KR2019/015141 dated Feb. 20, 2020 [PCT/ISA/210].

*Primary Examiner* — Mark Edwards
(74) *Attorney, Agent, or Firm* — Sughrue Mion, PLLC (57) ABSTRACT

A pad electrode part includes a plurality of pad electrodes transmitting a sensing signal of a sensing cell part to a flexible printed circuit board (FPCB). The pad electrode includes a plurality of widthwise arrangement groups arranged spaced apart in a width direction, and the plurality of widthwise arrangement groups are arranged to be spaced apart in a longitudinal direction as well. A pad electrode of the first widthwise arrangement group and a pad electrode of the second widthwise arrangement group have a same area but different lengths and widths.

19 Claims, 7 Drawing Sheets

(56) References Cited

U.S. PATENT DOCUMENTS

2018/0061306 A1\*   3/2018   Eom ................... G09G 3/2092
2018/0113557 A1\*   4/2018   Noguchi ............. G06F 3/04166

FOREIGN PATENT DOCUMENTS

| KR | 10-1202552 B1 | 11/2012 |
| KR | 10-2013-0057957 A | 6/2013 |
| KR | 10-1426077 B1 | 8/2014 |
| KR | 10-2015-0129975 A | 11/2015 |
| KR | 10-2016-0070591 A | 6/2016 |
| KR | 10-2018-0086604 A | 8/2018 |

\* cited by examiner

PAD ELECTRODE PART AND TOUCH SENSOR THEREWITH

CROSS REFERENCE TO RELATED APPLICATIONS

This is a National Stage of International Application No. PCT/KR2019/015141 filed Nov. 8, 2019, claiming priority based on Korean Patent Application No. 10-2018-0137379 filed Nov. 9, 2018 and Korean Patent Application No. 10-2019-0141972 filed Nov. 7, 2019, the contents of all of which are incorporated herein by reference in their entirety.

TECHNICAL FIELD

The present invention relates to a touch sensor. Specifically, the present invention relates to a touch sensor having a pad electrode part of a staggered structure.

BACKGROUND ART

A touch sensor of a smartphone or the like is an input device that receives a command by a touch. There are a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type can detect such a change in current to detect whether or not it is touched.

A touch sensor includes a plurality of sensing cells arranged in X and Y axes on a transparent substrate to accurately determine the contact location. The sensing cell is formed of a rhombus shape or the like except for end portions. The sensing cells may be classified into the first sensing electrodes connected in the X axis direction and the second sensing electrodes connected in the Y axis direction, which may be respectively connected to the first and second wiring parts.

The first and second wiring parts may extend along side edges of the transparent substrate to be connected to a pad electrode part formed at a lower edge of the transparent substrate. The pad electrode part may then be connected to a flexible printed circuit board (FPCB). The FPCB may be adhered and connected to the pad electrode part through an anisotropic conductive film (ACF) or the like.

Recently, due to the pursuit of high resolution of touch sensors, the number of sensing cells and wires is increasing, and the number of pad electrodes bound to the wires is also increasing.

However, it is difficult to increase the number of pad electrodes in the pad electrode part due to a limited area available at the lower edge of the transparent substrate, and due to process tolerances in wiring gap, connection between the FPCB and pad electrodes, and the like.

In order to solve this problem, Korean Patent Publication No. 2015-0129975 or the like proposes a method of increasing the number of electrode pads by arranging electrode pads in a staggered structure.

The staggered structure of the pad electrode part proposed in Korean Patent Publication No. 2015-0129975 or the like has pad electrodes of the same shape arranged to be spaced apart in the longitudinal direction. However, there is a limit in increasing the number of pad electrodes in a limited area at the lower edge of the transparent substrate. In addition, in two or more rows, the gap between the pad electrode and wiring rapidly narrows, causing frequent connection failures in connection with the FPCB.

DISCLOSURE OF INVENTION

Technical Problem

The present invention is to solve the above problems of the prior art and intends to provide a high-resolution touch sensor capable of greatly increasing the number of rows separated along the longitudinal direction of a pad electrode part in a staggered structure but preventing a connection failure between the pad electrode part and the FPCB by sufficiently securing a gap between the pad electrode and the wiring.

Technical Solution

A pad electrode part of the present invention to achieve this object may include a plurality of pad electrodes to transmit a sensing signal received from a wiring part to an FPCB. The plurality of pad electrodes may form a plurality of widthwise arrangement groups arranged spaced apart in a width direction. The plurality of widthwise arrangement groups may be spaced apart in a longitudinal direction. In the plurality of widthwise arrangement groups, a pad electrode of a first widthwise arrangement group and a pad electrode of a second widthwise arrangement group may have a same area but different lengths and widths.

In the pad electrode part of the present invention, the plurality of pad electrodes may be disposed such that the second widthwise arrangement group is closer to a sensing cell part than the first widthwise arrangement group. In this case, the pad electrode of the second widthwise arrangement group may be shorter in length and wider in width than the pad electrode of the first widthwise arrangement group.

In the pad electrode part of the present invention, the pad electrode of the second widthwise arrangement group may be disposed between wires connected to the pad electrodes of the first widthwise arrangement group.

In the pad electrode part of the present invention, the pad electrode of the second widthwise arrangement group may overlap with a wire connected to the pad electrode of the first widthwise arrangement group. In this case, it may comprise an insulation layer between the wire and the pad electrode, and a second row contact portion penetrating the insulation layer to connect the pad electrode of the second widthwise arrangement group with a wire corresponding to the pad electrode of the second widthwise arrangement group.

The pad electrode part of the present invention may comprise a first row contact portion penetrating the insulation layer to connect the pad electrode of the first widthwise arrangement group with a wire corresponding to the pad electrode of the first widthwise arrangement group.

In the pad electrode part of the present invention, the second widthwise arrangement group may be disposed closer to a sensing cell part than the first widthwise arrangement group. In this case, the pad electrode of the second widthwise arrangement group may be longer in length and narrower in width than the pad electrode of the first widthwise arrangement group.

In the pad electrode part of the present invention, the pad electrode of the second widthwise arrangement group may be disposed between wires connected to the pad electrodes of the first widthwise arrangement group.

In the pad electrode part of the present invention, a length of the pad electrode of the first widthwise arrangement group may be different from a width of the pad electrode of the second widthwise arrangement group.

In the pad electrode part of the present invention, a width of the pad electrode of the first widthwise arrangement group may be different from a length of the pad electrode of the second widthwise arrangement group.

The pad electrode part of the present invention may be used as a configuration of a touch sensor together with a sensing cell part including a plurality of sensing cells and a wiring part including a plurality of wires to transmit a sensing signal of the sensing cell part to the pad electrode part.

The pad electrode part of the present invention may be used as a configuration of a mobile terminal.

Advantageous Effects

According to the pad electrode part of the present invention having such a configuration, the number of rows separated in the longitudinal direction in the pad electrode part of a staggered structure may be greatly increased by reducing the length of the pad electrodes spaced apart in the pad electrode part along the longitudinal direction. Through this, it is possible to significantly increase the sensing signal processing capacity in a high-resolution touch sensor such as a fingerprint sensor.

According to the pad electrode part of the present invention, problems such as a decrease in the width of the pad electrode occurred in the pad electrode part of a staggered structure and a poor connection between the pad electrode part and the FPCB due to a decrease in the gap between the pad electrode and the wiring can be solved.

In addition, according to the pad electrode part of the present invention, pad electrodes spaced apart in the longitudinal direction can be formed on the same plane using an insulation layer and a contact portion, so that it is possible to easily connect the pad electrode part and the FPCB using ACF or the like.

BEST MODE

Hereinafter, the present invention will be described in detail with reference to the accompanying drawings.

Figure 1:
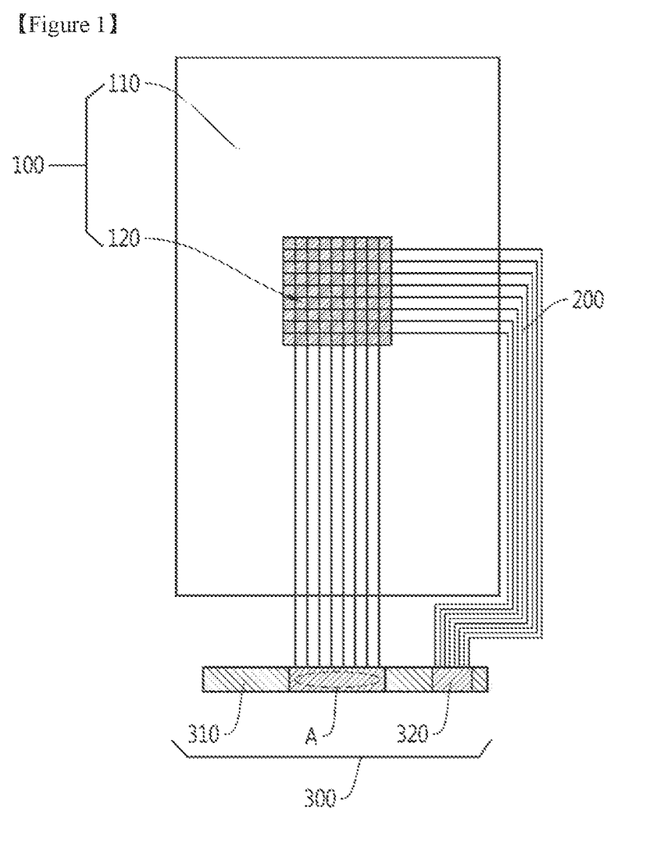
FIG. 1 is a plan view of a touch sensor having a pad electrode part of a staggered structure according to the present invention.

FIG. 1 is a plan view of a touch sensor having a pad electrode part of a staggered structure according to the present invention.

As shown in FIG. 1, the touch sensor may be largely divided into a sensing area and a driving area. The sensing area may include a sensing cell part 100, and the driving area may include a wiring part 200, a pad electrode part 300, an FPCB (not shown), and so on.

The sensing cell part 100 may include a plurality of sensing cells. A first sensing electrode is formed by connecting a plurality of sensing cells arranged in a horizontal (X-axis) direction and a second sensing electrode is formed by connecting a plurality of sensing cells arranged in a vertical (Y-axis) direction on a transparent substrate. A plurality of first and second sensing electrodes may be arranged in a horizontal or vertical direction. The sensing cell can be configured in the form of an island. The sensing cells can be connected through a bridge. As another example, the sensing cells in the X-axis array and the sensing cells in the Y-axis array may be insulated through an insulation layer.

The sensing cell part 100 may include a general touch area 110, a fingerprint touch area 120, and so on. The general touch area 110 can be implemented with a low resolution, but the fingerprint touch area 120 requires a high resolution. In the low-resolution general touch area 110, adjacent sensing electrodes may be bundled and connected to the wiring part 200, and, in the high-resolution fingerprint touch area 120, the sensing electrodes may respectively be connected to the wiring part 200.

In the fingerprint touch area 120, a pitch between sensing cells may be 110 μm or less in consideration of the interval of the fingerprint ridges (usually 50 to 200 μm), and 70 μm or less for precise sensing. In the fingerprint touch area 120, the sensing cell part 100 may be configured in a structure in which a transparent metal oxide layer, a thin metal layer, and a transparent metal oxide layer are sequentially stacked. In this case, the transparent metal oxide layer may have a thickness of 10 to 60 nm, and the thin metal layer may have a thickness of 5 to 20 nm. The sensing cell part 100 may have a structure in which a thin metal layer and a transparent metal oxide layer are sequentially stacked. In this case, the thin metal layer may have a thickness of 50 to 300 nm, and the transparent metal oxide layer may have a thickness of 5 to 50 nm. The sensing cell unit 100 may be composed only of a thin metal layer, and, in this case, the thin metal layer may have a thickness of 50 to 300 nm.

The wiring part 200 transmits a sensing signal of the sensing cell part 100 to the pad electrode part 300 and may include a plurality of wires. The wiring part 200 may include a touch signal wire connected to the sensing electrode of the general touch area 110 and a fingerprint signal wire connected to the sensing electrode of the fingerprint touch area 120. One side of the touch signal wire may be simultaneously connected to several sensing electrodes and the other side may respectively be connected to a pad electrode of the pad electrode part 300. One side of the fingerprint signal wire may be connected to the sensing electrode and the other side may be connected to the pad electrode of the pad electrode part, respectively.

The wiring part 200 may be disposed in a peripheral area of the sensing cell part 100. The wiring part 200 may be disposed on one side as shown in FIG. 1 or may be disposed separately on both sides. When disposed on both sides, the wiring part 200 may be alternately connected to the sensing electrodes in the vertical direction on the left and the right sides.

The pad electrode part 300 transmits a sensing signal received from the wiring part 200 to the FPCB, and it may include a plurality of pad electrodes. The pad electrode part 300 may be divided into a touch signal pad electrode part 310 for receiving a sensing signal of the general touch area 110 and a fingerprint signal pad electrode part 320 for receiving a sensing signal of the fingerprint touch area 120. In the fingerprint signal pad electrode part 320, pad electrodes may be arranged with high density due to the high resolution of the fingerprint touch area 120.

In the pad electrode part 300, pad electrodes may be arranged in a staggered structure. The pad electrode part 300 may form a plurality of pad electrode groups in a width direction (hereinafter, abbreviated as 'widthwise arrangement groups') by arranging a plurality of pad electrodes spaced apart in the width direction (horizontal direction in FIG. 1). A plurality of widthwise arrangement groups may be arranged spaced apart in the longitudinal direction as well. In the plurality of widthwise arrangement groups spaced apart in the longitudinal direction, the pad electrodes of the first widthwise arrangement group and the pad electrodes of the second widthwise arrangement group are configured to have the same area, but the length (vertical direction in FIG. 1) and width (horizontal direction in FIG. 1) may be made different. By changing the shape of the pad electrodes, the density of the pad electrodes can be greatly increased. The high-density arrangement of pad electrodes is effective in processing high-resolution signals such as fingerprint touch signals. However, when high-resolution processing is required even in the general touch area 110, the pad electrode part 300 having such high-density pad electrode arrangement may be applied.

The pad electrode part 300 may be formed by forming a conductive layer for the pad electrode on a protective layer or a separation layer through a dry process such as sputtering and deposition or a wet process such as dip coating, spin coating, roll coating, and spray coating and then patterning through a laser process or wet etching. The pad electrode part 300 may also be formed through a direct patterning process such as a screen printing method, a gravure printing method, an inkjet printing method, or the like.

One side of the FPCB (not shown) may be connected to the pad electrode part 300 to directly process or transmit a sensing signal to a processor and may transmit a driving signal to the sensing cell part 100 through the pad electrode part 300.

The FPCB may be adhered to the pad electrode part 300 using an adhesive including a photocurable resin. As the adhesive, an anisotropic conducting film (ACF) having a plurality of conductive balls may be used.

Figure 2:
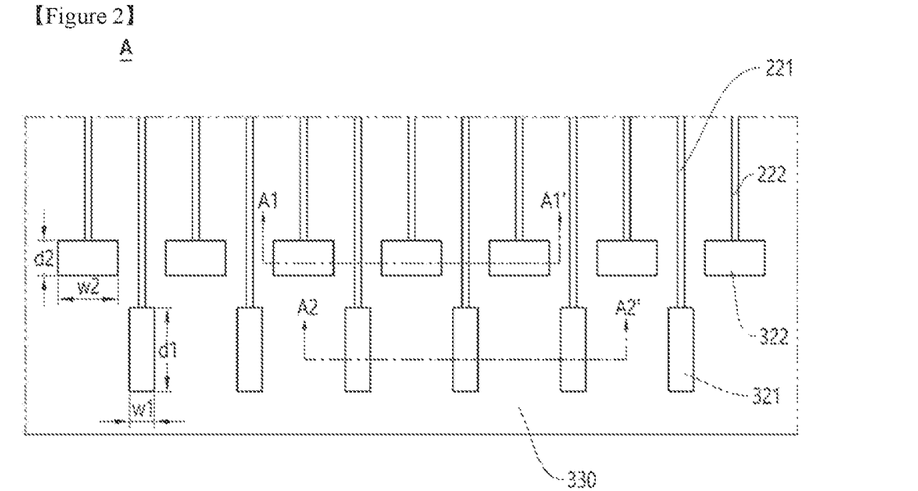
FIG. 2 is a plan view showing a pad electrode part of the first embodiment according to the present invention.

FIG. 2 is a plan view showing a pad electrode part of the first embodiment according to the present invention.

As shown in FIG. 2, in the pad electrode part 300 of the first embodiment, a plurality of pad electrodes may be arranged in a staggered structure, that is, a plurality of widthwise arrangement groups spaced apart in the width direction (horizontal direction in FIG. 2) may be arranged to be spaced apart in the longitudinal direction (vertical direction in FIG. 2).

The first widthwise arrangement group may be disposed in an outward portion of the pad electrode part 300, that is, away from the sensing cell part 100. A first row pad electrodes 321 of the first widthwise arrangement group may have a rectangular shape in which the length d1 is greater than the width w1. The first row pad electrode 321 may be connected to a first row wire 221.

The second widthwise arrangement group may be disposed closer to the sensing cell part 100 than the first widthwise arrangement group. A second row pad electrodes 322 of the second widthwise arrangement group may be positioned between the first row wires 221. The second row pad electrode 322 may be disposed not to overlap the first row wire 221 in a plane. The second row pad electrode 322 may be in the shape of a rectangle with a length d2 shorter than the length d1 of the first row pad electrode 321 and a width w2 larger than the width w1 of the first row pad electrode 321. The second row pad electrode 322 may be connected to a second row wire 222.

The area d2*w2 of the second row pad electrode 322 may be the same as the area d1*w1 of the first row pad electrode 32L Here, the length d1 of the pad electrode 321 of the first widthwise arrangement group may be configured to be different from the width w2 of the pad electrode of the second widthwise arrangement group, or different from the width w1 of the pad electrode 321 of the first widthwise arrangement group and the length d2 of the pad electrode 322 of the second widthwise arrangement group.

Figure 3A:
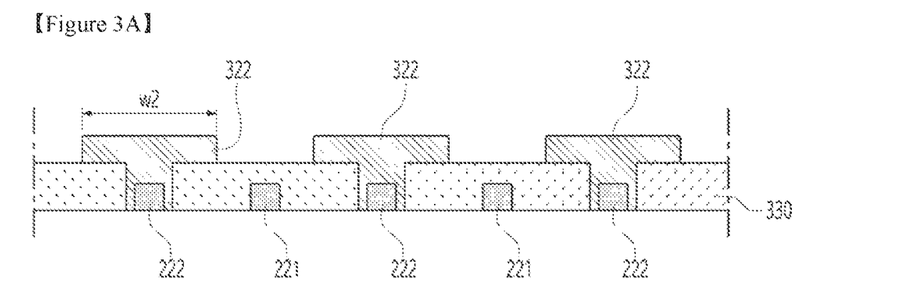
FIGS. 3A and 3B are cross-sectional views taken along line A1-A1' in the pad electrode part of the first embodiment.
Figure 3B:
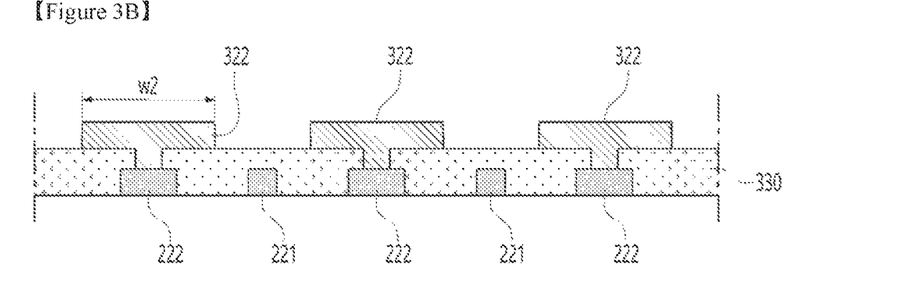

FIGS. 3A and 3B are cross-sectional views taken along line A1-A1' in the pad electrode part of the first embodiment.

As shown in FIG. 3A, when the second widthwise arrangement group is cut along the cutting line A1-A1' and viewed in cross section, the first row wire 221 and the second row wire 222 are formed in an insulation layer 330 to be in the same plane and spaced apart in the width direction. The second row pad electrode 322 is connected to the second row wire 222, and its upper side may protrude upwardly over the upper surface of the insulation layer 330. Here, when the first row wire 221 and the second row wire 222 are formed to have the same narrow width, the second row pad electrode 322 may surround and couple to the top and side surfaces of the second row wire 222. In this case, a contact hole in the insulation layer 330 may be formed larger than the width of the second row wire 222.

As shown in FIG. 3B, the second row wire 222 may be formed to have a wide width in the area connected to the second row pad electrode 322 to increase connectivity. In this case, the second row pad electrode 322 may be coupled to a portion of the upper surface of the second row wire 222, and the contact hole in the insulation layer 330 may be formed to have a width smaller than the width of the second row wire 222.

Figure 4A:
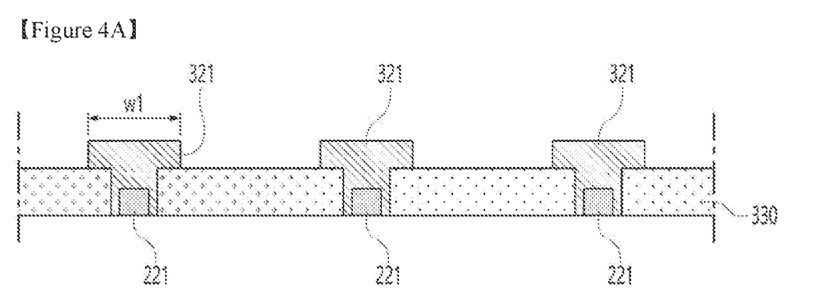
FIGS. 4A and 4B are cross-sectional views taken along line A2-A2' in the pad electrode part of the first embodiment.
Figure 4B:
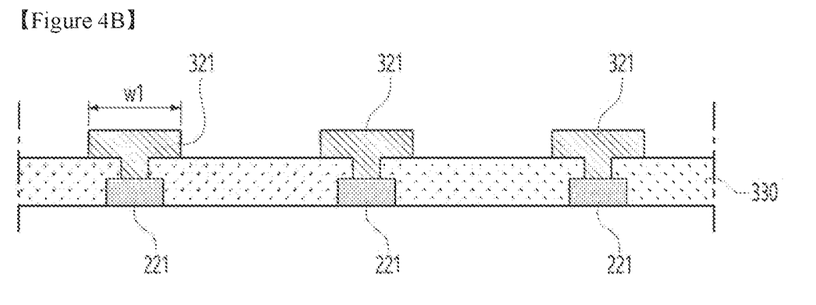

FIGS. 4A and 4B are cross-sectional views taken along line A2-A2' in the pad electrode part of the first embodiment.

As shown in FIG. 4A, when the first widthwise arrangement group is cut along the cutting line A2-A2' and viewed in cross section, the first row wire 221 may be formed in the insulation layer 330 to be spaced apart in the width direction. The first row pad electrode 321 is connected to the first row wire 221, and its upper side may protrude upwardly over the upper surface of the insulation layer 330. Here, when the first row wire 221 and the second row wire 222 are formed to have the same narrow width, the first row pad electrode 321 may surround and couple to the top and side surfaces of the first row wire 221. In this case, a contact hole in the insulation layer 330 may be formed larger than the width of the first row wire 221. The second row wire 222 may not be formed up to the area of the first row pad electrode 321.

As shown in FIG. 4B, the first row wire 221 may be formed to have a wide width in the area connected to the first row pad electrode 321 to increase connectivity. In this case, the first row pad electrode 321 may be coupled to a portion of the upper surface of the first row wire 221, and the contact hole in the insulation layer 330 may be formed to have a width smaller than the width of the first row wire 221.

Figure 5:
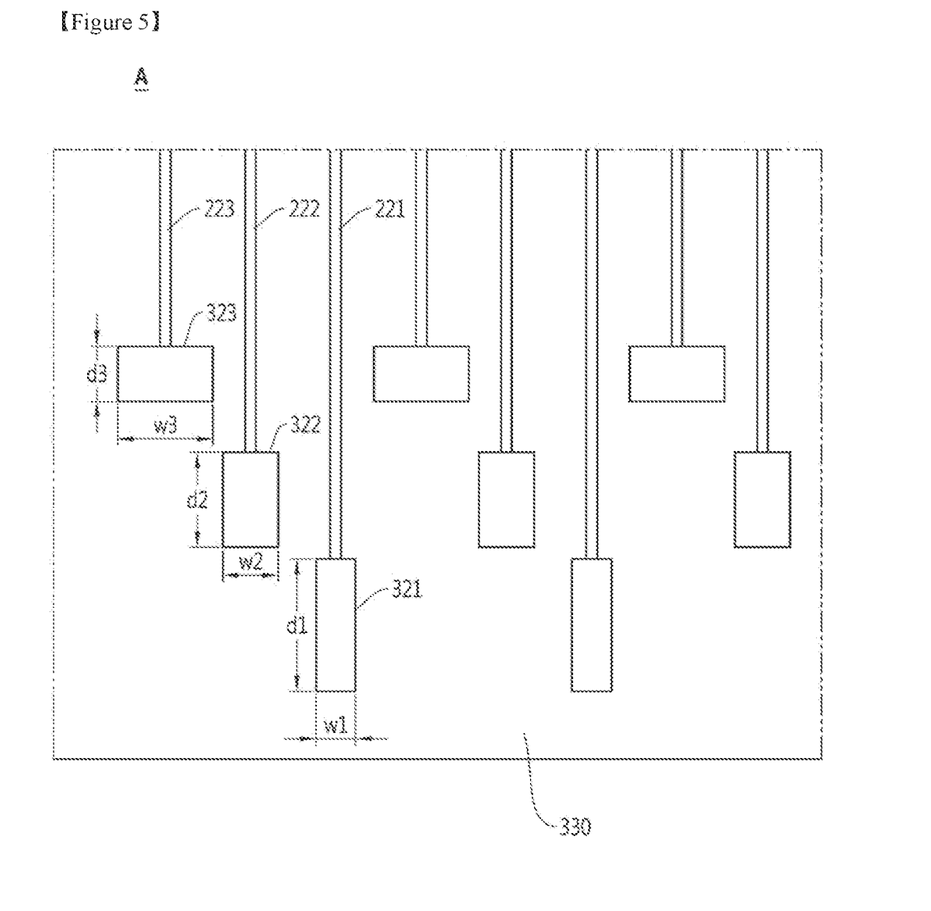
FIG. 5 is a plan view showing a modified example of the pad electrode part of the first embodiment according to the present invention.

FIG. 5 is a plan view showing a modified example of the pad electrode part of the first embodiment according to the present invention.

The first embodiment of FIG. 2 described above shows that the widthwise arrangement groups are composed of two rows, the first row and the second row, but it is not limited to this arrangement, and three or more widthwise arrangement groups may be organized in the longitudinal direction. In this case, the area of the third row pad electrode 323 of the third widthwise arrangement group may be maintained equal to the area of the second row pad electrode 322, but the length d3 may be smaller than the length d2 of the second row pad electrode 322 and the width w3 may be larger than the width w2 of the second row pad electrode 322. The third row pad electrode 323 may be connected to the third row wire 223.

Figure 6:
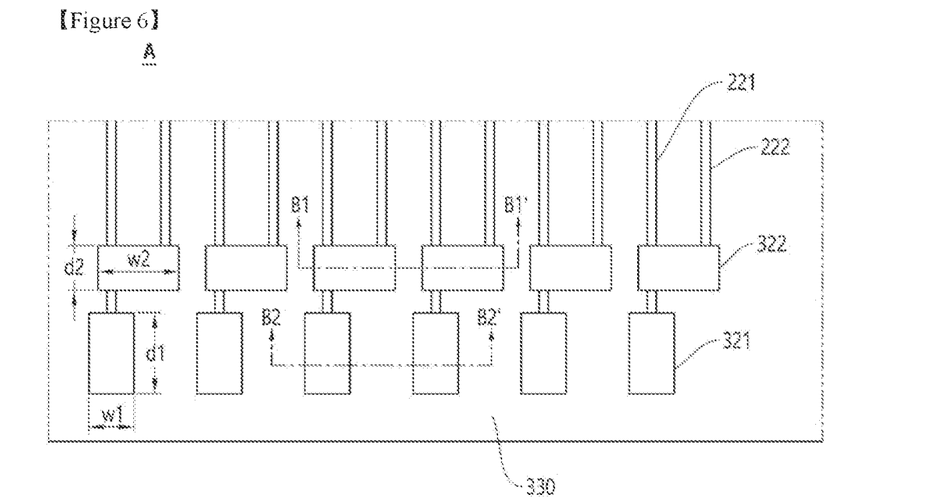
FIG. 6 is a plan view showing a pad electrode part of a second embodiment according to the present invention.

FIG. 6 is a plan view showing a pad electrode part of a second embodiment according to the present invention.

As shown in FIG. 6, in the pad electrode part 300 of the second embodiment, there is presented a pad electrode arrangement in which a plurality of pad electrodes are arranged in a staggered structure and a second row pad electrode 322 overlaps a part of a first row wire 221. The second embodiment may be effective when the fingerprint touch area 120 is implemented with an ultra-high resolution, so that the wiring gap of the wiring part 200 is extremely narrow or the number of pad electrodes is rapidly increased.

As shown in FIG. 6, the second row pad electrode 322 may be disposed in a three-dimensional structure that partially overlaps the first row wire 221 on a plane, that is, vertically, but it is insulated from the first row wire 221 thereunder. Even in this case, the second row pad electrode 322 may be configured in a square shape in which the length d2 is smaller than the length d1 of a first row pad electrode 321 and the width w2 is larger than the width w1 of the first row pad electrode 321. The area d2*w2 of the second row pad electrode 322 may be the same as the area d1*w1 of the first row pad electrode 321.

FIG. 6 shows that the widthwise arrangement groups are composed of two rows, the first row and the second row, but it is not limited to this, and three or more widthwise arrangement groups may be organized in the longitudinal direction. In this case, the area of the third row pad electrode of the third widthwise arrangement group may be maintained equal to the area of the second row pad electrode 322, but the length may be smaller than the length d2 of the second row pad electrode 322 and the width may be larger than the width w2 of the second row pad electrode 322. The third row pad electrode may overlap a second row wire 222 or overlap both the first and second row wires 221 and 222 in a plane. In this case, the third row pad electrode may be configured to be insulated from the lower first and second row wires 221 and 222, respectively.

Figure 7A:
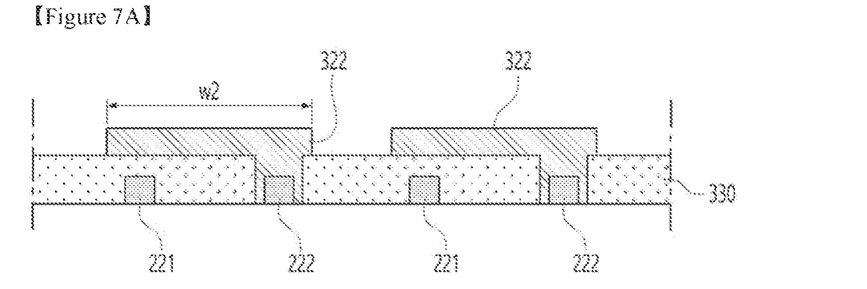
FIGS. 7A and 7B are cross-sectional views taken along line B1-B1' in the pad electrode part of the second embodiment.
Figure 7B:
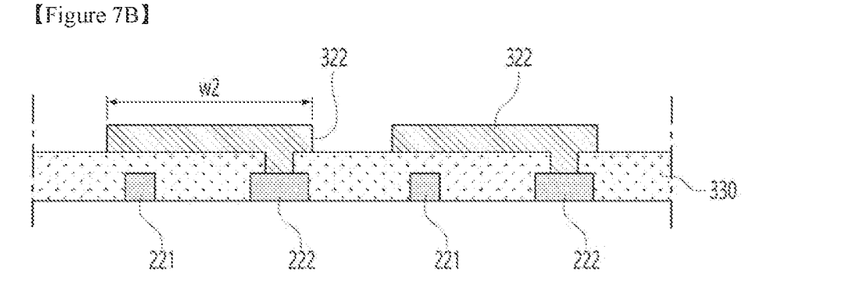

FIGS. 7A and 7B are cross-sectional views taken along line B1-B1' in the pad electrode part of the second embodiment.

As shown in FIGS. 7A and 7B, when the second widthwise arrangement group is cut along the cutting line B1-B1' and viewed in cross section, the first row wire 221 and the second row wire 222 are formed in an insulation layer 330 to be in the same plane and spaced apart in the width direction. The second row pad electrode 322 may be connected to the second row wire 222. The insulation layer 330 vertically insulates the second row pad electrode 322 from the first row wire 221.

Since the widths of the first and second row wires 221 and 222 and the connection structure of the second row wire 222 and the second row pad electrode 322 are the same as those in FIGS. 3A and 3B described above, detailed descriptions of these are replaced with the related description of FIGS. 3A and 3B.

Figure 8A:
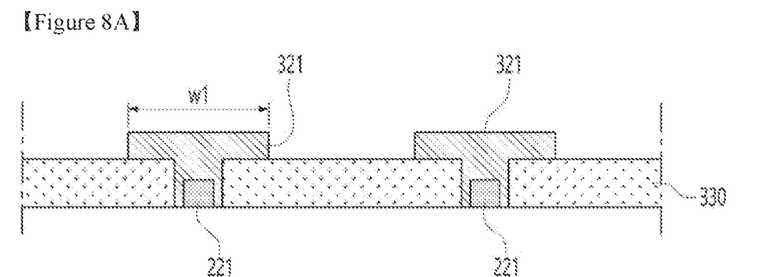
FIGS. 8A and 8B are cross-sectional views taken along line B2-B2' in the pad electrode part of the second embodiment.
Figure 8B:
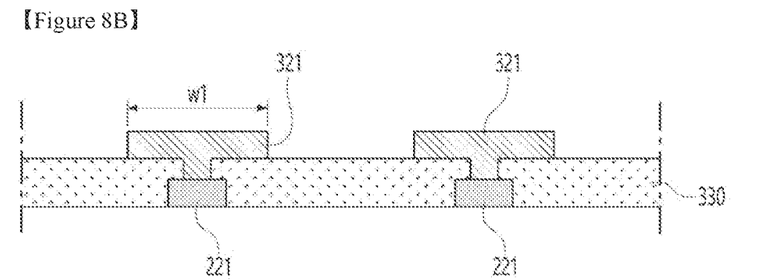

FIGS. 8A and 8B are cross-sectional views taken along line B2-B2' in the pad electrode part of the second embodiment.

As shown in FIGS. 8A and 8B, when the first widthwise arrangement group is cut along the cutting line B2-B2' and viewed in cross section, the first row wire 221 may be formed in the insulation layer 330 to be spaced apart in the width direction. The first row pad electrode 321 may be connected to the first row wire 221.

Since the width of the first row wire 221 and the connection structure of the first row wire 221 and the first row pad electrode 321 are the same as those in FIGS. 4A and 4B described above, detailed descriptions of these are replaced with the related description of FIGS. 4A and 4B.

Figure 9:
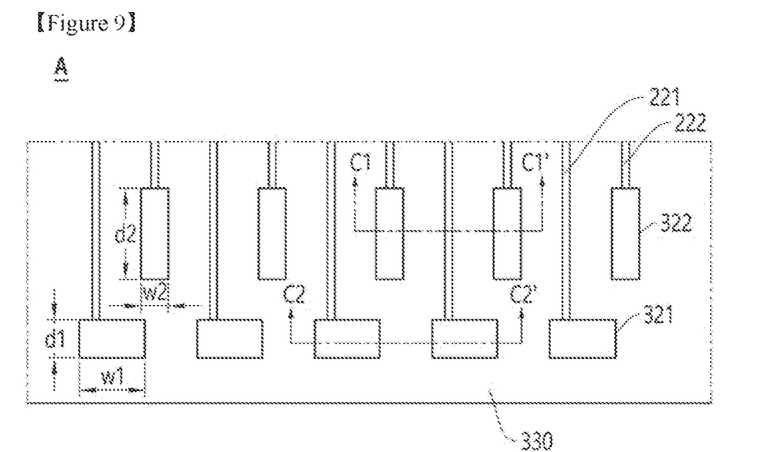
FIG. 9 is a plan view showing a pad electrode part of a third embodiment according to the present invention.

FIG. 9 is a plan view showing a pad electrode part of a third embodiment according to the present invention.

As shown in FIG. 9, in the pad electrode part 300 of the third embodiment, a plurality of pad electrodes are arranged in a staggered structure in which the length d2 of a second row pad electrode 322 is longer than the length d1 of a first row pad electrode 321 and the width w2 is smaller than the width w1 of the first row pad electrode 321. The area d2*w2 of the second row pad electrode 322 may be equal to the area d1*w1 of the first row pad electrode 321. Here, since the second row pad electrode 322 has a smaller width than the first row pad electrode 321, it may be disposed so as not to overlap a first row wire 221 in a plane.

FIG. 9 shows that the widthwise arrangement groups are composed of two rows, the first row and the second row, but it is not limited to this, and three or more widthwise arrangement groups may be arranged in the longitudinal direction. In this case, the third row pad electrode of the third widthwise arrangement group may have the length longer than the length d2 of the second row pad electrode 322, the width smaller than the width w2 of the second row pad electrode 322, and the area equal to those of the first and second row pad electrode 321 and 322.

Figure 10A:
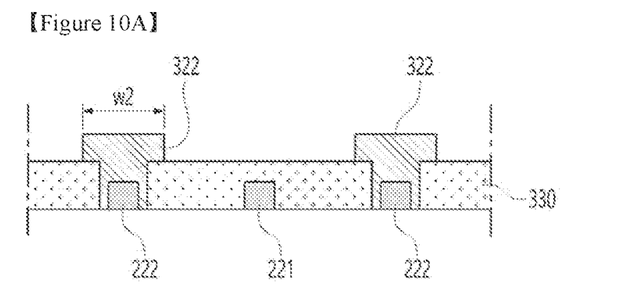
FIGS. 10A and 10B are cross-sectional views taken along line C1-C1' in the pad electrode part of the third embodiment.
Figure 10B:
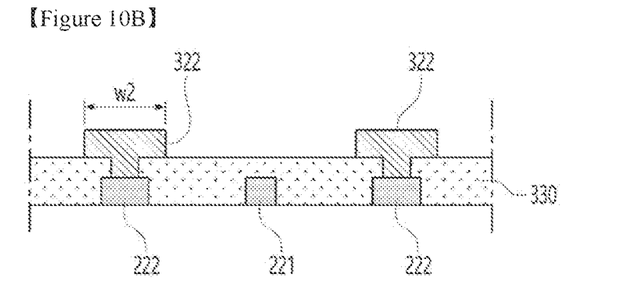

FIGS. 10A and 10B are cross-sectional views taken along line C1-C1' in the pad electrode part of the third embodiment.

As shown in FIGS. 10A and 10B, when the second widthwise arrangement group is cut along the cutting line C1-C1' and viewed in cross section, the first row wire 221 and the second row wire 222 are formed in an insulation layer 330 to be in the same plane and spaced apart in the width direction. The second row pad electrode 322 may be connected to the second row wire 222.

Since the widths of the first and second row wires 221 and 222 and the connection structure of the second row wire 222 and the second row pad electrode 322 are the same as those in FIGS. 3A and 3B described above, detailed descriptions of these are replaced with the related description of FIGS. 3A and 3B.

Figure 11A:
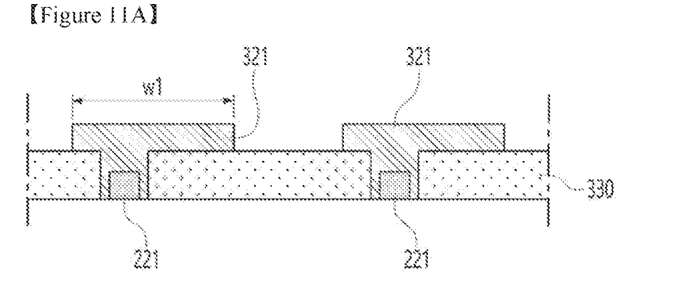
FIGS. 11A and 11B are cross-sectional views taken along line C2-C2' in the pad electrode part of the third embodiment.
Figure 11B:
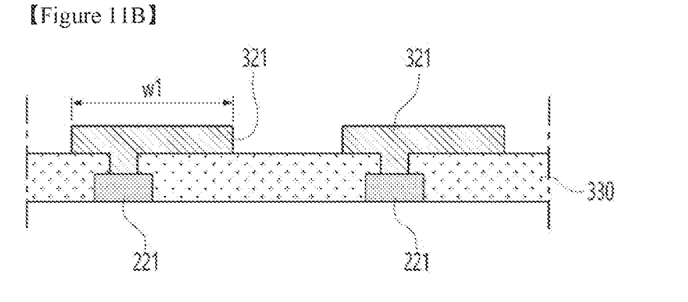

FIGS. 11A and 11B are cross-sectional views taken along line C2-C2' in the pad electrode part of the third embodiment.

As shown in FIGS. 11A and 11B, when the first widthwise arrangement group is cut along the cutting line C2-C2' and viewed in cross section, the first row wire 221 may be formed in the insulation layer 330 to be spaced apart in the width direction. The first row pad electrode 321 may be connected to the first row wire 221. The second row wire 222 may not be formed up to the area of the first row pad electrode 321.

Since the width of the first row wire 221 and the connection structure of the first row wire 221 and the first row pad electrode 321 are the same as those in FIGS. 4A and 4B described above, detailed descriptions of these are replaced with the related description of FIGS. 4A and 4B.

In the pad electrode part described above, it may be desirable to freely configure the lengths and widths of the first row pad electrode 321 and the second row pad electrode 322 while maintaining the areas of the first row pad electrode 321 and the second row pad electrode 322 the same. For example, the length of the first row pad electrode 321 and the length of the second row pad electrode 322 may be different, the length of the first row pad electrode 321 and the width of the second row pad electrode 322 may be different, or the width of the first row pad electrode 321 and the length of the second row pad electrode 322 may be different. In addition, the length and width of the pad electrode in one row can be made shorter than the long side length of the pad electrode in another row, so that the total length or width of the pad electrode part can be prevented from becoming too long or wide.

The pad electrode part according to the present invention can be widely applied to touch sensors such as low-resolution touch sensors and high-resolution touch sensors.

In addition, the pad electrode part according to the present invention can be applied not only to portable terminals such as smartphones and PDAs equipped with touch sensors, but also to fixed terminals which may include touch sensors.

The preferred embodiments of the present invention have been described with reference to the drawings. However, the present invention is not limited to the above-described embodiments, and it will be understood that the present invention can be implemented in a modified form without departing from the essential characteristics of the present invention. Therefore, the scope of the present invention is defined by the claims rather than the foregoing description, and all differences within the equivalent range should be interpreted as being included in the present invention.

| [Description of reference numerals] | |
|---|---|
| 100: sensing cell part | 110: general touch area |
| 120: fingerprint touch area | 200: wiring part |
| 221: first row wire | 222: second row wire |
| 223: third row wire | 300: pad electrode part |
| 310: touch signal pad electrode part | 320: fingerprint signal pad electrode part |
| 321: first row pad electrode | 322: second row pad electrode |
| 323: third row pad electrode | 330: insulation layer |

The invention claimed is:

1. A pad electrode part comprising a plurality of pad electrodes transmitting a sensing signal received from a wiring part to a flexible printed circuit board (FPCB), the plurality of pad electrodes including:
   a first group of pad electrodes arranged spaced apart in a width direction, and
   a second group of pad electrodes arranged spaced apart in a width direction and spaced apart from the first group of pad electrodes in a longitudinal direction,
   wherein all pad electrodes of the first group of pad electrodes have same lengths and same widths, and all pad electrodes of the second group of pad electrodes have same lengths and same widths, and
   a pad electrode of the first group of pad electrodes and a pad electrode of the second group of pad electrodes have a same area but different lengths and widths.

2. The pad electrode part according to claim 1, wherein the second group of pad electrodes is disposed closer to a sensing cell part than the first group of pad electrodes, and
   the pad electrode of the second group of pad electrodes is shorter in length and wider in width than the pad electrode of the first group of pad electrodes.

3. The pad electrode part according to claim 2, wherein the pad electrode of the second group of pad electrodes is disposed between wires connected to the pad electrodes of the first group of pad electrodes.

4. The pad electrode part according to claim 2, wherein at least a part of the pad electrode of the second group of pad electrodes overlaps with a wire connected to the pad electrode of the first group of pad electrodes, and the pad electrode part further comprises:
   an insulation layer coupled between the wire and the pad electrode; and
   a second row contact portion penetrating the insulation layer to connect the pad electrode of the second group of pad electrodes with a second row wire corresponding to the pad electrode of the second group of pad electrodes.

5. The pad electrode part according to claim 4, further comprising a first row contact portion penetrating the insulation layer to connect the pad electrode of the first group of pad electrodes with a first row wire corresponding to the pad electrode of the first group of pad electrodes.

6. The pad electrode part according to claim 1, wherein the second group of pad electrodes is disposed closer to a sensing cell part than the first group of pad electrodes, and
   the pad electrode of the second group of pad electrodes is longer in length and narrower in width than the pad electrode of the first group of pad electrodes.

7. The pad electrode part according to claim 6, wherein the pad electrode of the second group of pad electrodes is disposed between wires connected to the pad electrodes of the first group of pad electrodes.

8. The pad electrode part according to claim 1, wherein a length of the pad electrode of the first group of pad electrodes is different from a width of the pad electrode of the second group of pad electrodes.

9. The pad electrode part according to claim 1, wherein a width of the pad electrode of the first group of pad electrodes is different from a length of the pad electrode of the second group of pad electrodes.

10. A touch sensor comprising the pad electrode part according to claim 1.

11. A mobile terminal comprising the touch sensor according to claim 10.

12. A touch sensor comprising the pad electrode part according to claim 2.

13. A touch sensor comprising the pad electrode part according to claim 3.

14. A touch sensor comprising the pad electrode part according to claim 4.

15. A touch sensor comprising the pad electrode part according to claim 5.

16. A touch sensor comprising the pad electrode part according to claim 6.

17. A touch sensor comprising the pad electrode part according to claim 7.

18. A touch sensor comprising the pad electrode part according to claim 8.

19. A touch sensor comprising the pad electrode part according to claim 9.

\* \* \* \* \*